(12) United States Patent
Ellisor et al.

(10) Patent No.: US 12,055,221 B2
(45) Date of Patent: **\*Aug. 6, 2024**

(54) DUAL RING STUFFING BOX

(71) Applicant: Vulcan Industrial Holdings, LLC, Houston, TX (US)

(72) Inventors: Kyle Matthew Ellisor, Katy, TX (US); Chance Ray Mullins, Spring, VA (US); Steven Zachary Newberg, Houston, TX (US); Akhil Alex, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,873

(22) Filed: Jul. 14, 2022

(65) Prior Publication Data

US 2022/0349472 A1 Nov. 3, 2022

Related U.S. Application Data

(63) Continuation-in-part of application No. 17/213,854, filed on Mar. 26, 2021, now Pat. No. 11,391,374, (Continued)

(51) Int. Cl.
*F16J 15/18* (2006.01)
*E21B 43/26* (2006.01)

(52) U.S. Cl.
CPC .......... *F16J 15/18* (2013.01); *E21B 43/2607* (2020.05)

(58) Field of Classification Search
CPC .......... F16J 15/18; F16J 15/181; F16J 15/182; F16J 15/183; F16J 15/184; E21B 43/2607; F04B 1/122
See application file for complete search history.

(56) References Cited

U.S. PATENT DOCUMENTS

| 1,316,539 A | 9/1919 | Ford |
| 1,364,848 A | 1/1921 | Walsh |

(Continued)

FOREIGN PATENT DOCUMENTS

| CN | 201149099 | 11/2008 |
| CN | 102748483 | 10/2012 |

(Continued)

OTHER PUBLICATIONS

U.S. Appl. No. 16/814,267, 194 pages.
(Continued)

*Primary Examiner* — Gilbert Y Lee
(74) *Attorney, Agent, or Firm* — Womble Bond Dickinson (US) LLP

(57) ABSTRACT

A system includes a fluid end having a fluid end face and a recess extending toward a base. The system also includes a pressure ring extending from the fluid end face, the pressure ring having a pressure ring bore diameter larger than a fluid end bore diameter. The system further includes an adjacent ring coupled to the fluid end, the pressure ring positioned between the adjacent ring and the base, wherein at least one fastener extends through an aperture of the adjacent ring to couple the adjacent ring to the fluid end. The system includes packing material positioned within at least a portion of the pressure ring bore, the packing material positioned such that axial movement toward the fluid end is blocked by the base.

18 Claims, 14 Drawing Sheets

Related U.S. Application Data which is a continuation-in-part of application No. 29/769,314, filed on Feb. 4, 2021, now Pat. No. Des. 933,104, and a continuation-in-part of application No. 29/769,318, filed on Feb. 4, 2021, now Pat. No. Des. 933,105.

(60) Provisional application No. 63/137,501, filed on Jan. 14, 2021.

(56) References Cited

U.S. PATENT DOCUMENTS

| | | |
|---|---|---|
| 1,576,269 A | 3/1926 | Durant |
| 1,595,459 A | 8/1926 | Durant |
| 1,671,139 A | 5/1928 | Wilson |
| 1,873,318 A | 8/1932 | Eason |
| 1,914,737 A | 6/1933 | Elms |
| 1,948,628 A | 2/1934 | Penick |
| 1,963,684 A | 6/1934 | Shimer |
| 1,963,685 A | 6/1934 | Shimer |
| 2,011,547 A | 8/1935 | Campbell |
| 2,069,443 A | 2/1937 | Hill |
| 2,103,504 A | 12/1937 | White |
| 2,143,399 A | 1/1939 | Abercrombie |
| 2,151,442 A | 3/1939 | Hardy |
| 2,163,472 A | 6/1939 | Shimer |
| 2,252,488 A | 8/1941 | Bierend |
| 2,304,991 A | 12/1942 | Foster |
| 2,506,128 A | 5/1950 | Ashton |
| 2,547,831 A | 4/1951 | Mueller |
| 2,713,522 A | 7/1955 | Lorenz |
| 2,719,737 A | 10/1955 | Fletcher |
| 2,745,631 A | 5/1956 | Shellman |
| 2,756,960 A | 7/1956 | Church |
| 2,898,082 A | 8/1959 | Von Almen |
| 2,969,951 A | 1/1961 | Walton |
| 2,977,874 A | 4/1961 | Ritzerfeld et al. |
| 2,982,515 A | 5/1961 | Clinton |
| 2,983,281 A | 5/1961 | Bynum |
| 3,049,082 A | 8/1962 | Barry |
| 3,053,500 A | 9/1962 | Atkinson |
| 3,063,467 A | 11/1962 | Roberts, Jr. |
| 3,224,817 A | 12/1965 | Carter |
| 3,276,390 A | 10/1966 | Bloudoff |
| 3,277,837 A | 10/1966 | Pangburn |
| 3,288,475 A | 11/1966 | Benoit |
| 3,459,363 A | 8/1969 | Miller |
| 3,474,808 A | 10/1969 | Elliott |
| 3,483,885 A | 12/1969 | Leathers |
| 3,489,098 A | 1/1970 | Roth |
| 3,489,170 A | 1/1970 | Leman |
| 3,512,787 A | 5/1970 | Kennedy |
| 3,590,387 A | 6/1971 | Landis |
| 3,640,501 A | 2/1972 | Walton |
| 3,809,508 A | 5/1974 | Uchiyama |
| 3,907,307 A | 9/1975 | Maurer |
| 3,931,755 A | 1/1976 | Hatridge |
| 4,044,834 A | 8/1977 | Perkins |
| 4,076,212 A | 2/1978 | Leman |
| 4,184,814 A | 1/1980 | Parker |
| 4,219,204 A | 8/1980 | Pippert |
| 4,277,229 A | 7/1981 | Pacht |
| 4,331,741 A | 5/1982 | Wilson |
| 4,395,050 A | 7/1983 | Wirz |
| 4,398,731 A | 8/1983 | Gorman |
| 4,440,404 A | 4/1984 | Roach |
| 4,508,133 A | 4/1985 | Hamid |
| 4,518,359 A | 5/1985 | Yao-Psong |
| 4,527,806 A | 7/1985 | Ungchusri |
| 4,565,297 A | 1/1986 | Korner |
| 4,662,392 A | 5/1987 | Vadasz |
| 4,754,950 A | 7/1988 | Tada |
| 4,763,876 A | 8/1988 | Oda |
| 4,770,206 A | 9/1988 | Sjoberg |
| 4,807,890 A | 2/1989 | Gorman |
| 4,811,758 A | 3/1989 | Piper |
| 4,861,241 A | 8/1989 | Gamboa |
| 4,872,395 A | 10/1989 | Bennitt et al. |
| 4,919,719 A | 4/1990 | Abe |
| 4,951,707 A | 8/1990 | Johnson |
| 5,020,490 A | 6/1991 | Seko |
| 5,052,435 A | 10/1991 | Crudup |
| 5,061,159 A | 10/1991 | Pryor |
| 5,062,450 A | 11/1991 | Bailey |
| 5,080,713 A | 1/1992 | Ishibashi |
| 5,088,521 A | 2/1992 | Johnson |
| 5,127,807 A | 7/1992 | Eslinger |
| 5,131,666 A | 7/1992 | Hutchens |
| 5,135,238 A | 8/1992 | Wells |
| 5,149,107 A | 9/1992 | Maringer |
| 5,201,491 A | 4/1993 | Domangue |
| 5,209,495 A | 5/1993 | Palmour |
| 5,249,600 A | 10/1993 | Blume |
| 5,267,736 A | 12/1993 | Pietsch |
| 5,273,570 A | 12/1993 | Sato |
| 5,314,659 A | 5/1994 | Hidaka |
| 5,478,048 A | 12/1995 | Salesky |
| 5,533,245 A | 7/1996 | Stanton |
| 5,540,570 A | 7/1996 | Schuller |
| 5,572,920 A | 11/1996 | Kennedy |
| 5,626,345 A | 5/1997 | Wallace |
| 5,636,688 A | 6/1997 | Bassinger |
| 5,674,449 A | 10/1997 | Liang |
| 5,834,664 A | 11/1998 | Aonuma |
| 5,859,376 A | 1/1999 | Ishibashi |
| 5,895,517 A | 4/1999 | Kawamura |
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr. |
| 6,328,312 B1 | 12/2001 | Schmitz |
| 6,340,377 B1 | 1/2002 | Kawata |
| 6,382,940 B1 | 5/2002 | Blume |
| 6,436,338 B1 | 8/2002 | Qiao |
| 6,446,939 B1 | 9/2002 | Hoppe |
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |

(56) References Cited

U.S. PATENT DOCUMENTS

| | | |
|---|---|---|
| 7,757,396 B2 | 7/2010 | Sawada |
| 7,789,133 B2 | 9/2010 | McGuire |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,954,510 B2 | 6/2011 | Schwegman |
| 7,992,635 B2 | 8/2011 | Cherewyk |
| 8,069,923 B2 | 12/2011 | Blanco |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,261,771 B2 | 9/2012 | Witkowski |
| 8,287,256 B2 | 10/2012 | Shafer |
| 8,291,927 B2 | 10/2012 | Johnson |
| 8,317,498 B2 | 11/2012 | Gambier |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,534,691 B2 | 9/2013 | Schaffer |
| 8,613,886 B2 | 12/2013 | Qiao |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,978,695 B2 | 3/2015 | Witkowkski |
| 8,998,593 B2 | 4/2015 | Vicars |
| 9,010,412 B2 | 4/2015 | McGuire |
| 9,103,448 B2 | 8/2015 | Nitkowski |
| 9,150,945 B2 | 10/2015 | Bei |
| 9,157,136 B2 | 10/2015 | Chou |
| 9,157,468 B2 | 10/2015 | Dille |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,359,921 B2 | 6/2016 | Hashimoto |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,393,113 B2 | 8/2019 | Wagner |
| 10,400,764 B2 | 9/2019 | Wagner |
| 10,415,348 B2 | 9/2019 | Zhang |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| 10,626,856 B2 | 4/2020 | Coldren |
| 10,633,925 B2 | 4/2020 | Panda |

(56) References Cited

U.S. PATENT DOCUMENTS

| | | |
|---|---|---|
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,815,988 B2 | 10/2020 | Buckley |
| 10,830,360 B2 | 11/2020 | Frank |
| 10,851,775 B2 | 12/2020 | Stark |
| 10,865,325 B2 | 12/2020 | Nakao |
| 10,907,738 B2 | 2/2021 | Nowell |
| 10,914,171 B2 | 2/2021 | Foster |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,028,662 B2 | 6/2021 | Rhodes |
| 11,041,570 B1 | 6/2021 | Buckley |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yar |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,162,859 B2 | 11/2021 | Lei |
| 11,181,101 B2 | 11/2021 | Byrne |
| 11,181,108 B2 | 11/2021 | Brooks |
| 11,231,111 B2 | 1/2022 | Hurst |
| 11,242,849 B1 | 2/2022 | Smith |
| 11,353,117 B1 | 6/2022 | Smith |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,900 B2 | 9/2022 | Alex |
| 11,473,686 B2 | 10/2022 | Bayyouk |
| 11,566,713 B2 | 1/2023 | Poremski |
| D980,876 S | 3/2023 | Smith |
| D986,928 S | 5/2023 | Smith et al. |
| D997,992 S | 9/2023 | Smith et al. |
| 11,761,441 B1 | 9/2023 | Alex et al. |
| 11,846,356 B1 | 12/2023 | Ellisor |
| 11,920,684 B1 | 3/2024 | Xu et al. |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0273105 A1 | 11/2007 | Stanton |
| 2007/0295411 A1 | 12/2007 | Schwegman |
| 2008/0031769 A1 | 2/2008 | Yeh |
| 2008/0052014 A1 | 2/2008 | Toyosada |
| 2008/0092384 A1 | 4/2008 | Schaake |
| 2008/0240949 A1* | 10/2008 | Tackett .................. F16J 15/406 |
| | | 277/304 |
| 2008/0279706 A1 | 11/2008 | Gambier |
| 2009/0041611 A1 | 2/2009 | Sathian |
| 2009/0278069 A1 | 11/2009 | Blanco |
| 2009/0261575 A1 | 12/2009 | Bull |
| 2010/0230628 A1 | 9/2010 | Stefina |
| 2010/0272597 A1 | 12/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2012/0141308 A1 | 6/2012 | Saini |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0322034 A1 | 10/2014 | Bayyouk |
| 2014/0322050 A1* | 10/2014 | Marette .................. F04B 49/22 |
| | | 417/437 |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0319626 A1 | 11/2016 | Dille |
| 2016/0319805 A1 | 11/2016 | Dille |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0159655 A1 | 6/2017 | Morreale |
| 2017/0218951 A1 | 8/2017 | Graham |
| 2017/0218993 A1 | 8/2017 | Freed |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |

(56) References Cited

U.S. PATENT DOCUMENTS

| | | |
|---|---|---|
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0063430 A1 | 8/2019 | Byrne |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0360483 A1 | 11/2019 | Nowell |
| 2019/0376508 A1 | 12/2019 | Wagner |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0023245 A1 | 7/2020 | Blume |
| 2020/0208776 A1 | 7/2020 | Bayyouk |
| 2020/0217424 A1 | 7/2020 | Rasmussen |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1* | 12/2020 | Mullins ............... F16J 15/406 |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0108734 A1 | 4/2021 | Nowell |
| 2021/0130936 A1 | 5/2021 | Wu |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0349472 A1 | 11/2022 | Ellisor |
| 2022/0390055 A1 | 12/2022 | Ellisor |
| 2022/0403839 A1 | 12/2022 | Mullins |
| 2023/0407864 A1 | 12/2023 | Alex et al. |
| 2024/0117882 A1 | 4/2024 | Ellisor |

FOREIGN PATENT DOCUMENTS

| | | |
|---|---|---|
| CN | 102410194 | 4/2021 |
| EP | 0 414 955 | 3/1991 |

OTHER PUBLICATIONS

U.S. Appl. No. 17/120, 121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages.
Cutting Tool Engineering, "Groove milling," Aug. 1, 2012, https://www.ctemag.cojm/news/articles/groove-milling, accessed May 13, 2020, 11 pages.
Vargususa, "Groovex Innovative Grooving Solutions—Groove Milling, " Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.

(56) References Cited

OTHER PUBLICATIONS

Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Ex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
Kerrpumps, "Super Stainless Steel Better Than The Best," http://kerrpumps.com/superstainless?gclid=EAlalQobChMlg470482q6wlVilTICh2XPA-qEAAYASAAEgKrxPD_BwE, 2013, last accessed: Aug. 21, 2020, 6 pages.
Kerrpumps, "Frac One Pumps—Fluid End—Fracing," http://kerrpumps.com/fracone, 2013, last accessed: Aug. 21, 2020, 3 pages.
Kerrpumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP QUINTUPLEX," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages. https://www.diwmsi.com/pumping/qi-1000/.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends for Well Stimulation Pumps," 2015, 2 pages.
Claim Chart for U.S. Pat. No. 6,544,012, 23 pages.
Claim Chart for U.S. Pat. No. 7, 186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.

(56) References Cited

OTHER PUBLICATIONS

Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants for Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale Niti Compression Pillars", Scripta Materialia 59(12), 7-10, 2008.
Naghipour et al., "Fatigue Analysis of Notched Laminates: A Time-Efficient Macro-Mechanical Approach", Ohio Aerospace Institute, Cleveland, 2016.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.
Weir SPM Oil & Gas, Well Service Pump Reference Guide, 2008, 55 pages.
*Intellectual Ventures I LLC* v *VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.

*Trilogy Enterprises, Inc.*, v. *Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean* v *Baylor University*, Case No. 6:19-CV-00465-ADA-JCM, Document 34, Scheduling Order, Apr. 6, 2020, 4 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.
*Kerr Machine Co.*, v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co.*, v *Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co.*, v. *Vulcan Industrial Holdings, LLC*, Case. No. 6:20-CV-00200-ADA, Affidavit of Service, Apr. 7, 2020, 1 page.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiff's Preliminary Infringement Contentions, May 22, 2020, 50 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC d/b/a/ Vulcan Industrial*

(56) References Cited

OTHER PUBLICATIONS

*Manufacturing*, Case No. 6:20-CV-00200-ADA, Document 54, Claim Construction Order, Dec. 3, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co., v Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al., v Kuiper Dairy, LLC, et al.*, Case No. 6:20-CV-00250-ADA-JCM, Document 20, Scheduling Order, Jul. 22, 2020, 4 pages.
*Acquanlan Deonshay Harris v. Cenlar, FSB*, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken, Individually and as Next Friend of A.M.B., v Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal v. Roger Lee Thomas and Apple Logistics, Inc.*, Case No. 6:20-CV-00356-ADA-JCM, Document 12, Scheduling Order, Jul. 28, 2020, 4 pages.
*Tipton International, Inc., v. Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc., v. Hunting Titan, Ltd.; Hunting Titan, Inc.; and Hunting Energy Services, Inc.*, Case No. H-17-3784, Order, Sep. 4, 2020, 2 pages.
Slip Opinion, in re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd., v. 3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
International Search Report and Written Opinion for international application No. PCT/US2023/066143, mailed Aug. 28, 2023.
International Search Report and Written Opinion for international application No. PCT/US2023/073458, mailed Feb. 1, 2024.

\* cited by examiner

DUAL RING STUFFING BOX

CROSS REFERENCE TO RELATED APPLICATIONS

This application is a continuation-in-part of U.S. patent application Ser. No. 17/213,854 (now U.S. Pat. No. 11,391,374), filed on Mar. 26, 2021, titled "DUAL RING STUFFING BOX," which claims the benefit of U.S. Provisional Patent Application No. 63/137,501, filed on Jan. 14, 2021, titled "DUAL RING STUFFING BOX," and is a continuation-in-part and claims the benefit of U.S. patent application Ser. No. 29/769,314, filed on Feb. 4, 2021, titled "FLUID END FOR A PUMPING SYSTEM" and is a continuation-in-part and claims the benefit of U.S. patent application Ser. No. 29/769,318, filed on Feb. 4, 2021, titled "FLUID END FOR A PUMPING SYSTEM," the full disclosures of which are hereby incorporated in their entireties by reference.

TECHNICAL FIELD

Embodiments of the subject matter disclosed herein generally relate to pump systems, and in particular to sealing assemblies for pumping systems.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid. A stuffing box may be positioned around the plunger to block fluid leaks.

SUMMARY

Applicant recognized the problems noted above herein and conceived and developed embodiments of systems and methods, according to the present disclosure, for stuffing boxes.

In an embodiment, a system includes a pressure ring positioned to abut a fluid end face, the pressure ring having a pressure ring bore with a diameter larger than a fluid end bore diameter. The system also includes an adjacent ring coupled to a fluid end, the pressure ring positioned between the adjacent ring and the fluid end face. The system further includes a face seal positioned at an interface of the pressure ring and the fluid end face, the face seal containing pressurized fluid associated with the fluid end. The system also includes packing material positioned within at least a portion of the pressure ring bore.

In an embodiment, a system includes a fluid end, the fluid end having a recessed area extending to a fluid end face. The system further includes a pressure ring positioned within the recessed area against the fluid face to compress the face seal, the pressure ring having a pressure ring bore positioned co-axially with a fluid end bore, and the pressure ring bore has a diameter greater than the fluid end bore. The system also includes an adjacent ring positioned against the pressure ring and coupled to the fluid end. The system includes a face seal arranged between the pressure ring and the fluid end. The system further includes packing material positioned within the pressure ring bore, at least a portion of the packing material being positioned external to the fluid end bore.

In an embodiment, a method includes inserting a face seal into a face groove. The method also includes positioning a pressure ring, within a recessed portion, to compress the face seal. The method further includes positioning an adjacent ring against the pressure ring. The method also includes securing the adjacent ring to a fluid face, wherein the pressure ring is positioned between the adjacent ring and the fluid end. The method includes installing, within a pressure ring bore, packing material.

In an embodiment, a system includes a fluid end having a fluid end face and a recess extending toward a base. The system also includes a pressure ring extending from the fluid end face, the pressure ring having a pressure ring bore diameter larger than a fluid end bore diameter. The system further includes an adjacent ring coupled to the fluid end, the pressure ring positioned between the adjacent ring and the base, wherein at least one fastener extends through an aperture of the adjacent ring to couple the adjacent ring to the fluid end. The system includes packing material positioned within at least a portion of the pressure ring bore, the packing material positioned such that axial movement toward the fluid end is blocked by the base.

In an embodiment, a system includes a fluid end, the fluid end having a recessed area. The system also includes a pressure ring extending from the recessed area, the pressure ring having a pressure ring bore positioned co-axially with a fluid end bore, and the pressure ring bore having a diameter greater than the fluid end bore. The system further includes an adjacent ring positioned against the pressure ring and coupled to the fluid end. The system includes packing material positioned within the pressure ring bore, at least a portion of the packing material being positioned external to the fluid end bore. The system also includes an injection port extending through the adjacent ring, the injection port arranged in a low pressure region, axially away from a seal between the pressure ring and the adjacent ring.

In an embodiment, a method includes providing a fluid end including a recessed area extending into a fluid end face and a pressure ring extending axially out of the recessed area. The method also includes positioning an adjacent ring against the pressure ring. The method further includes securing the adjacent ring to the fluid end. The method includes installing, within a pressure ring bore, packing material.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
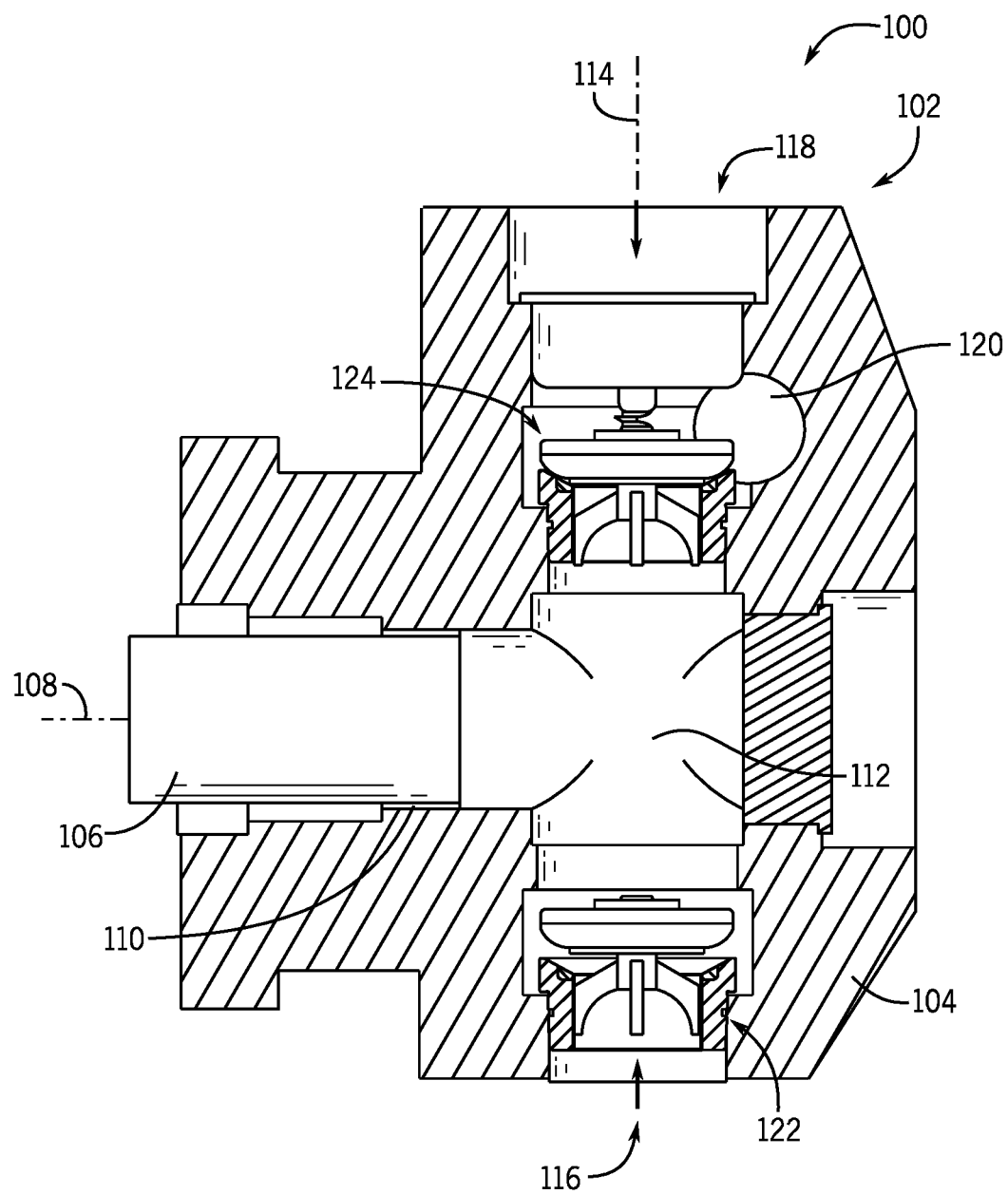
FIG. 1 is a schematic cross-sectional view of a prior art pump assembly.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Moreover, like numbers for may be used for like components, but such disclosure is for convenience purposes and is not intended to limit the scope of the present disclosure.

Traditional fluid ends feature an integrated stuffing box which requires a larger forging and more material to be removed. This is an expensive process. An alternative is a removable and replaceable stuffing box where the pressure vessel components are attached to the fluid end. This has been achieved previously by stuffing boxes which were threaded into the fluid end via large power threads such as ACME or Buttress profiles. These threaded stuffing boxes were heavy and difficult to install and then prone to failures of the threaded interfaces.

Embodiments of the present disclosure address and overcome problems faced with traditional stuffing boxes utilized with pumping units, such as fluid ends for fracturing pumps, and may be further incorporated in various systems with reciprocating components. In at least one embodiment, systems and methods of the present disclosure include a set of rings flanged into place such that a pressure containing ring is made from a wear resistant stainless steel, or any other type of wear resistant material, and an adjacent ring is made from a less expensive alloy steel, or any type of compatible material, as well as similar wear resistant materials. The two rings are joined together and preloaded by a series of fasteners (e.g., studs, nuts, bolts, cap screws, etc.). In various embodiments, the pressure containing ring houses a face seal or the fluid cylinder may house the face seal. Furthermore, the seal could be partially set into both. In one or more embodiments, a sealing element is arranged between the two rings, which includes a sealing component, such as an o-ring or other seal, which may be retained in the pressure ring, the adjacent ring, or both. Various embodiments also include a cross drilled weep hole where the intersecting holes may or may not be drilled entirely through the pressure ring. For example, in some iterations they may be intersecting blind holes. The pressure ring extends past the last pressure ring of a packing set such that anything closer to the exterior of the fluid end (e.g., radially outward from a pressure chamber) is not exposed to pressurized fracking fluid.

In one or more embodiments, systems and methods use studs and nuts that pass through dual rings of the stuffing box. It should be appreciated that these fasteners are provided by way of example only and are not intended to limit the scope of the present disclosure, as other fasteners, such as bolts and the like, may be used. Moreover, a threaded or otherwise locking interface between the rings may be utilized, such as a bayonet connection, J-hook, or the like. The fluid end may be machined such that an outside diameter of the pressure ring serves as a fine alignment feature during installation. The pressure ring may also be arranged such that it is also the only portion of the stuffing box exposed to the high pressure fracking fluid. Accordingly, in various embodiments, the pressure ring may be formed from a high grade stainless steel, among other wear resistant and/or specialized materials, while the adjacent ring would be made from alloy steel, among other types of materials, thereby reducing costs associated with implementation of the various embodiments disclosed herein. In at least one embodiment, the pressure ring may be integrally formed or be continuous with the materials associated with the fluid end.

Embodiments of the present disclosure may incorporate a sealing element within the fluid end body and/or within the pressure ring. This configuration may further include a single outer diameter. As a result, a seal designed to seal against the pressurized fluid may be retained by the pressure ring and/or the adjacent ring. Furthermore, embodiments may include a grease insertion point associated with the adjacent ring and also one or more threads to receive a packing nut. Moreover, a recessed shelf may be incorporated such that radial holes in the packing nut are clearly exposed above the heads of the fasteners (e.g., studs and nuts, bolts, cap screws, etc.). In certain embodiments, the packing set rests on the fluid end block surface. In others, the pressure containing ring features a shelf where a spacer ring may be installed and retained such that the packing assembly sits on the spacer ring.

In one or more embodiments, a section of removed material across a backside of the fluid end, such that the stuffing box does not sit within any bore but sits on the back face of the fluid end, is incorporated. For example, a recess or groove may be formed within the fluid end to receive the pressure ring. In one or more embodiments, the recess or groove may extend substantially across the entire fluid end. In certain embodiments, the recess or groove may be particularly located at individual locations for individual stuffing boxes. Furthermore, the pressure ring may extend from the fluid end face such that the groove or recess extends radially into the body of the fluid end. As will be described below, in various embodiments, the recess or groove may be squared or slanted. Furthermore, a depth of the recess or groove may be particularly selected based on one or more operating conditions for the fluid end.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet chamber 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

Piston pumps or plunger pumps, such as the pump assembly 100 shown in FIG. 1, are positive displacement pumps and are commonly used in environments where the fluids that are being handled pose problems such as high temperatures, viscous media, or solids-charged liquids. One such example is in oil and gas operations, particularly fracturing operations, where solids laden fluids may be used. Examples of these fluids include drilling fluids, muds, cement slurries, fracturing slurries, acids and the like, which frequently must be pumped under high pressure into the well. These abrasive fluids provide challenges for the various sealing interfaces of the pumps. One such interface includes along the plunger 106. As will be described, various systems and methods of the present disclosure may include a stuffing box configuration that includes one or more rings to secure a packing material along the bore 110 to block leakage of fluid out of the fluid end 102. In various embodiments, the one or more rings may be arranged external to the bore 110, such as against a face of the fluid end 102.

Figure 2:
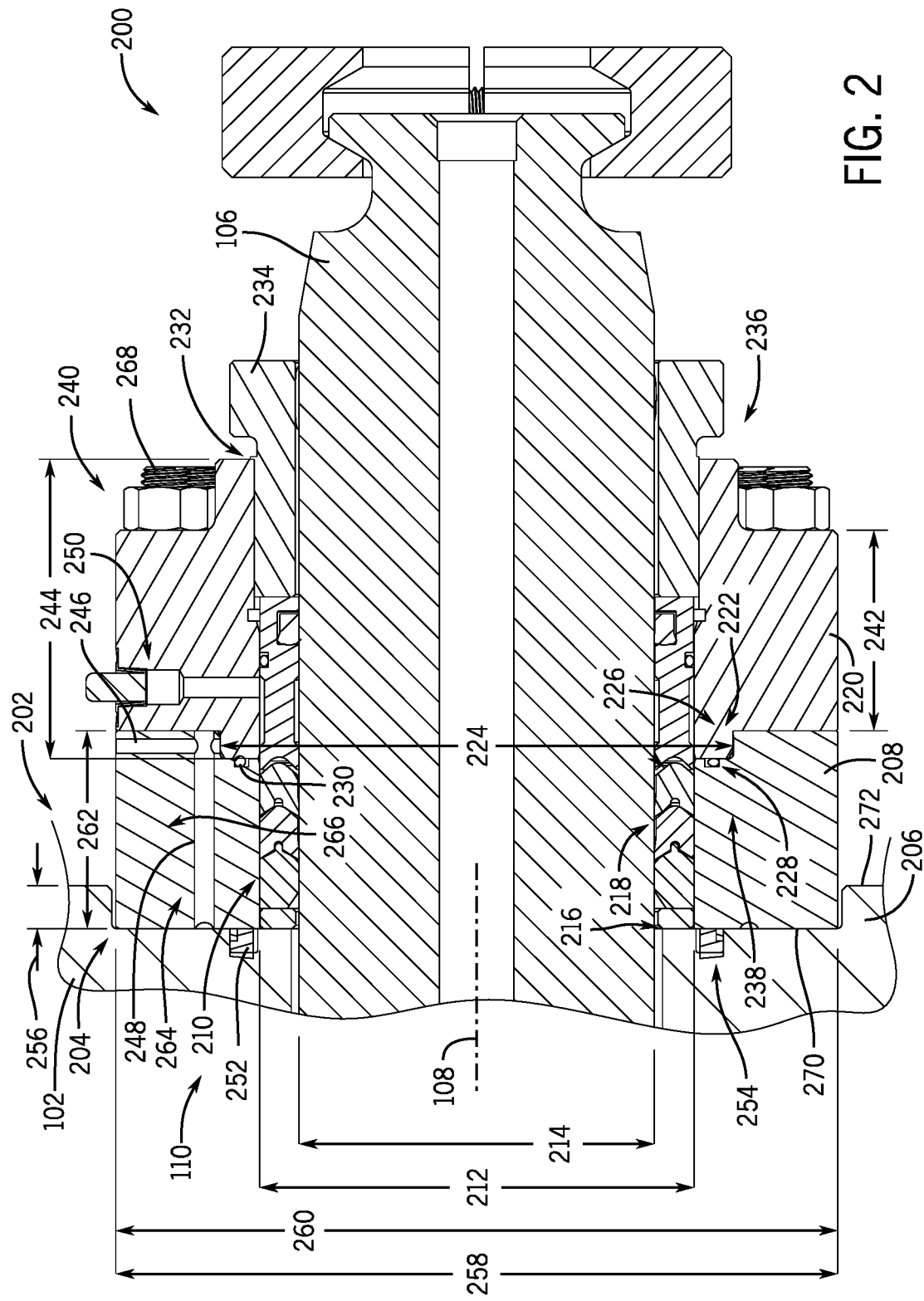
FIG. 2 is a cross-sectional view of an embodiment of a stuffing box assembly, in accordance with embodiments of the present disclosure.

FIG. 2 is a cross-sectional side view of an embodiment of a stuffing box assembly 200 that may be utilized with one or more reciprocating components, such as the plunger 106 illustrated in FIG. 1. As noted, like numerals may be used throughout to represent like features, but such numbering for convenience and is not intended to limit the scope of the present disclosure. In this example, the stuffing box assembly 200 is positioned on a back side 202 of the fluid end 102. It should be appreciated that "back side" is a relative term and is not intended to limit one or more orientations of the fluid end 102. The plunger 106 extends within the bore 110 along the plunger axis 108, as indicated above, and may be driven to reciprocate along the plunger axis 108 to add energy to the pressure chamber 112 (FIG. 1).

The illustrated stuffing box assembly 200 is positioned against a recessed area 204 (e.g., grooved area, offset area, depressed area, etc.) formed in the back side 202. In at least one embodiment, at least a portion of the stuffing box assembly 200 may extend at least partially into a recessed portion or cut out section formed with respect to the recessed area 204. In other words, the recessed area 204 represents a removal of material from the fluid end 102 and/or a forming process that provides an area with a reduced lateral position (with respect to the orientation of FIG. 2) compared to an adjacent area. In this example, the recessed area 204 includes a wall 206 forming the recessed area 204, which may be a continuous, annular wall 206. It should be appreciated that reference to a single wall is not intended to be limiting, as there may be various regions formed that have different radial extents or the like to prevent rotation and, moreover, the wall 206 may not be continuous in all embodiments. As an example, in one or more embodiments, the wall 206 extends for a length of the fluid end 102. However, in other examples, the wall 206 may extend for a particular extent. In one or more embodiments, the recessed portion and/or groove 206 may be omitted and the stuffing box assembly 200 may be pressed directly against the back side 202, for example along a planar region of the back side 202. By way of example only, a number of different grooves 204 may be formed along the back side 202, for example at each bore 110. In this example, the recessed area 204 receives a pressure ring 208 (e.g., a first ring, a pressure-containing ring) that abuts to the recessed area 204 such that at least a portion of the pressure ring 208 is overlapped by at least a portion of the wall 206. That is, the pressure ring 208 abuts against the recessed area 204 and, in various embodiments, at least a portion of the pressure ring 208 extends axially out of recessed portion associated with the recessed area 204 (e.g., axially along the plunger 108 in a direction away from the back side 202). It should be appreciated that a distance of axial extension may be particularly selected based on design conditions, and moreover, that a recessed area depth may also be particularly selected based on design conditions. As noted, in various embodiments, the recessed area 204 may be omitted such that the stuffing box assembly 200 is flush against the back side 202. The illustrated pressure ring 208 further includes a pressure ring bore 210 that is axially aligned with the bore 110 to enable reciprocation of the plunger 106 along the plunger axis 108. However, as will be described below, various dimensions of the pressure ring bore 210 may differ from the bore 110 to facilitate installation of various materials, such as one or more packing assemblies or components thereof.

In the example of FIG. 2, an inner diameter 212 of the pressure ring 208 is greater than an inner diameter 214 of the bore 110, thereby providing a shelf 216 for packing materials 218 (e.g., stuffing material, a packing assembly). The packing materials 218 include various components, such as seals, brass, and the like, which may be utilized to block fluid flow upward and along the plunger rod 106. The packing materials 218 may be particularly selected based, at least in part, on one or more operating conditions of the fluid end 102, as well as various dimensions of the shelf 216, plunger 106, and pressure ring 208, among other components. Accordingly, the illustrated configuration is for example purposes only, and it should be appreciated that more or less material may be included in embodiment where additional or less space is provided for the packing materials 218. It should further be appreciated that, in various embodiments, the shelf 216 may be formed, at least in part, by the pressure ring 208. For example, the inner diameter 212 may not be constant across the pressure ring 208 and may include the shelf 216 at a variable diameter portion. That is, the pressure ring 208 may include a first inner diameter at the inner diameter 212 and a second inner diameter, less than the first inner diameter 212, that forms the shelf. However, in various other embodiments, the first diameter 212 (e.g., the portion that engages the packing materials 218) may be smaller than a second inner diameter. Furthermore, one or more components, such as a spacer ring, may also be incorporated to serve as the shelf 216.

In various embodiments, an adjacent ring 220 (e.g., outer ring, second ring, non-pressure containing ring, etc.) is positioned to abut the pressure ring 208. In this example, the adjacent ring 220 is at least partially overlapped by the pressure ring 208. That is, an overlapped region 222 includes a second pressure ring inner diameter 224, larger than the inner diameter 212, that receives a lip 226 of the adjacent ring 220. As a result, a portion of the pressure ring 208 is illustrated as radially overlapping a portion of the adjacent ring 220. In various embodiments, the lip 226 is proximate a seal groove 228 formed in the pressure ring 208 that receives a seal 230. It should be appreciated that the seal groove 228 and the position of the seal 230 may also be within the adjacent ring 220 in other embodiments or may be partially within the pressure ring 208 and partially within the adjacent ring 220.

In various embodiments, the overlapped region 222 is configured to be axially farther from the back side 202 (e.g., toward the right relative to the orientation of FIG. 2) with respect to one or more packing materials 218 such that the adjacent ring 220 is not exposed to pressurized fluid from the fluid end 102. It should be appreciated that the overlapped region 222 may also be positioned along any portion of the packing materials 218 and that the configuration in FIG. 2 is for illustrative purposes only.

The adjacent ring 220 further includes a coupling region 232, which includes threads in this embodiment, to receive a retainer 234 (e.g., packing nut), which may include mating threads or the like. The retainer 234 may be utilized to maintain a position of the packing materials 218. It should be appreciated that the retainer 234 may be coupled to the adjacent ring 220 and/or to other components in a variety of ways, such as external fittings, clamps, and the like. As shown, the coupling region 232 is arranged at a first end 236 of the adjacent ring 220, opposite a second end 238. The first end 236 is farther from the back side 202 than the second end 238. The first end 236 further includes a stepped portion 240 such that a stepped portion length 242 is less than an adjacent ring length 244. The stepped portion 240 provides a region to receive one or more fasteners to couple the adjacent ring 220 to the pressure ring 208. For example, fasteners may extend through aligned apertures to join the components together. As illustrated, the stepped portion 240 positions the fasteners out of alignment with the retainer 234 to provide improved access to both components. In other words, the fasteners are arranged axially closer to the back side 202 than a top of the retainer 234 to facilitate access to each of the components. It should be appreciated that the fasteners illustrated are for illustrative purposes only and that other coupling devices may be utilized to join the pressure ring 208 to the adjacent ring 220.

Returning to the pressure ring 208, a weep hole 246 is illustrated extending radially through the pressure ring 208. In this example, the weep hole 246 intersects an axial hole 248 extending axially through the pressure ring 208. It should be appreciated that one or more of the weep hole 246 or the axial hole 248 may or may not extend entirely through the pressure ring 208. For example, one or more of the holes 246, 248 may extend to a particular region to form a blind. In this example, the weep hole 246 is positioned proximate the overlapping region 222, but various other locations may also include weep holes 246. That is, the weep holes 246 may be arranged at different locations along the axial length of the pressure ring 208. Furthermore, one or more weep holes 246 may be drilled circumferentially about the pressure ring 208 that intersect with one or more axial holes 248 or that do not intersect axial holes 248. By way of example, the pressure ring 208 may include multiple weep holes 246 arranged at different circumferential positions of the pressure ring 208 and one or more of these weep holes 246 may or may not intersect one or more additional axial holes 248.

The illustrated adjacent ring 220 also includes an injection port 250, which may be utilized to direct grease toward the packing material 218. It should be appreciated that the injection port may be arranged at any reasonable location to enable injection of various substances toward the bore 110. In various embodiments, it may be preferential to position the injection port 250 downstream of the seal 230 such that the injection port 250 is not subject to the pressure of the fracturing fluid.

In operation, the pressure ring 208 and the adjacent ring 220 are coupled to the fluid end 102, for example via fasteners. As illustrated, the back side 202 may include a face seal 252 between the back side 202 and the pressure ring 208. In this example, a face groove 254 is formed in the back side 202 to receive the face seal 252. It should be appreciated that, in other embodiments, the face seal 252 may be associated with the pressure ring 208, rather than the back side 202. For example, the face groove 254 may be formed in the pressure ring 208. Additionally, in at least one embodiment, the face groove 254 may be formed partially within the back side 202 and partially within the pressure ring 208. In one or more embodiments, the face seal 252 may seal against pressurized fluid within the fluid end 102. As shown, embodiments provide the packing materials 218 of the associated stuffing box assembly 200 abutting on the fluid end 102, rather than a sleeve being within the bore, as noted above.

Various embodiments of the present disclosure are directed toward a substantially external stuffing box assembly 200 that is not positioned within the bore 110, however, it should be appreciated that various alternative configurations may include the stuff box assembly 200 or portions thereof that extend into the bore 110. In this example, the groove 204 is formed within the back side 202 such that the groove 204 extends a groove depth 256 into the back side 202. The groove depth 256, as noted above, may be particularly selected based on operating conditions, tooling conditions, or the like. The illustrated groove 204 is formed with a groove height 258 that is configured to receive the pressure ring 208 with a secure fit such that the groove height 258 may be substantially equal to a pressure ring outer diameter 260. In embodiments, the configuration of the dimensions may facilitate alignment and installation of the components, where a misalignment may be visually established by resistance of fitting the pressure ring 208 into the groove 204. Other embodiments may include configurations where the groove height 258 is greater than the outer diameter 260.

As described above, various embodiments position the stuffing box assembly 200 external to the bore 110. In the illustrated embodiment, the pressure ring 208 extends axially away from the back side 202 such that at least a portion of a pressure ring thickness 262 is external the groove 204. That is, the pressure ring thickness 262 may include an internal portion 264 that is within the groove 204 and an external portion 266 that is outside of the groove 204. In various embodiments, the internal portion 264 is less than the external portion 266, but it should be appreciated that a variety of configurations may be utilized within the scope of the present disclosure (e.g., internal greater than external, portions equal, etc.). Accordingly, the pressure ring 208 may be fixed to the fluid end 102 via fasteners 268 that extend through the pressure ring 208 and the adjacent ring 220. In one or more embodiments, the fasteners 268 include threaded fasteners, such as bolts, but it should be appreciated that additional fasteners may also be used within the scope of the present disclosure, such as clamps, radial fasteners (as opposed to the illustrated axial fasteners), integrated bayonet fittings, and the like.

In various embodiments, the back side 202 may also be referred to as having a fluid end face 270, which may correspond to the surface within the groove 204. As a result, in the illustrated example, the pressure ring 208 would abut or otherwise be positioned against the fluid end face 270. Moreover, an outer face 272 may be used to describe the region around the groove 204, where the fluid end face 270 is axially closer to the internal components of the fluid end 102 than the outer face 272.

Figure 3:
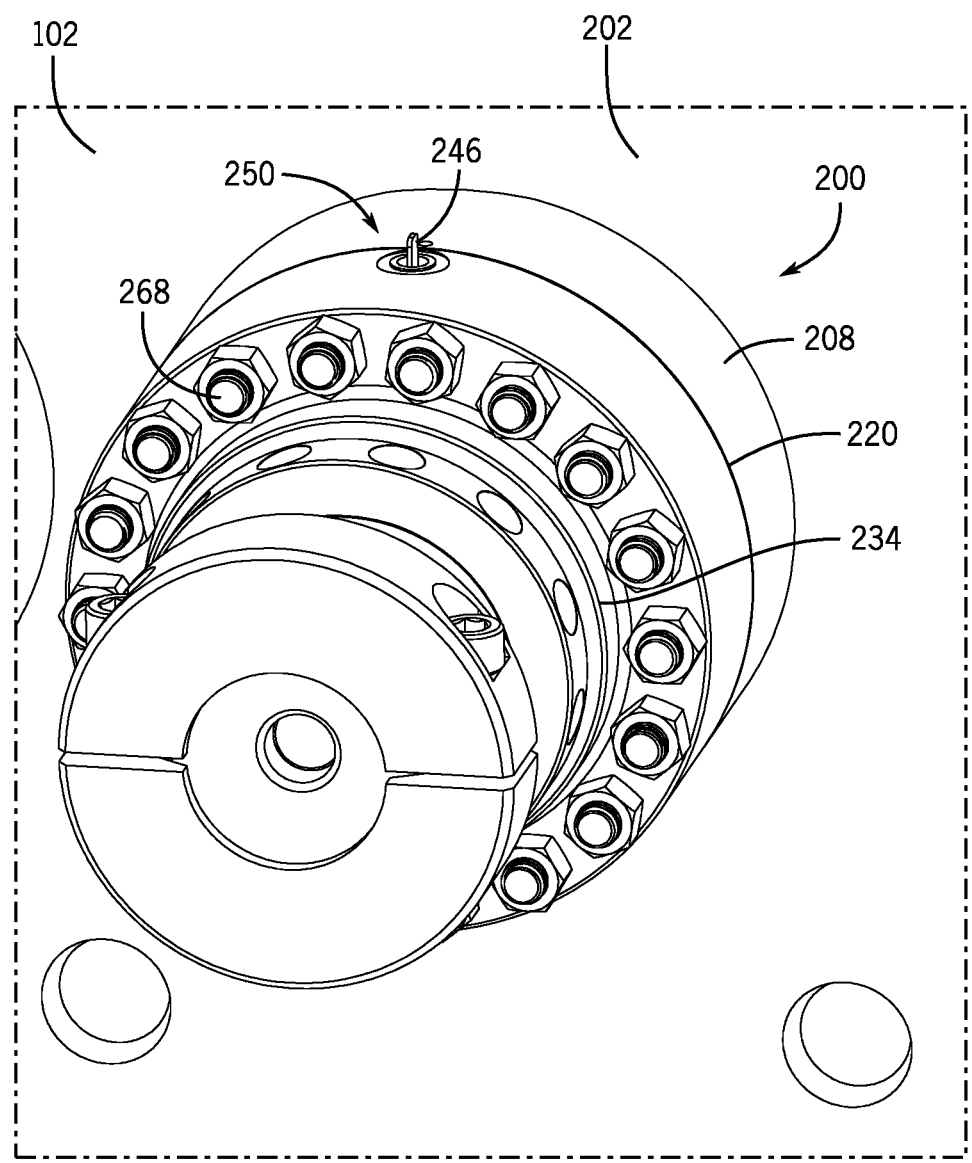
FIG. 3 is an isometric view of an embodiment of a stuffing box assembly, in accordance with embodiments of the present disclosure.

FIG. 3 is an isometric view of an embodiment of the stuffing box assembly 200. In this example, the pressure ring 208 and the adjacent ring 220 are both illustrated extending axially away from the back side 202. Further illustrated are the fasteners 268 that extend through the pressure ring 208 and the adjacent ring 220 to couple the stuffing box assembly 200 to the back side 202. For example, the fasteners 268 may extend into mating apertures formed in the fluid end 102. Moreover, as noted above, the retainer 234 is arranged within the adjacent ring 220, for example coupled via threads. The injection port 250 is arranged positioned proximate the weep whole 246. As noted above, while a single port 250 and single weep hole 246 are illustrated in this example, more may be included, for example at different circumferential positions.

Figure 4:
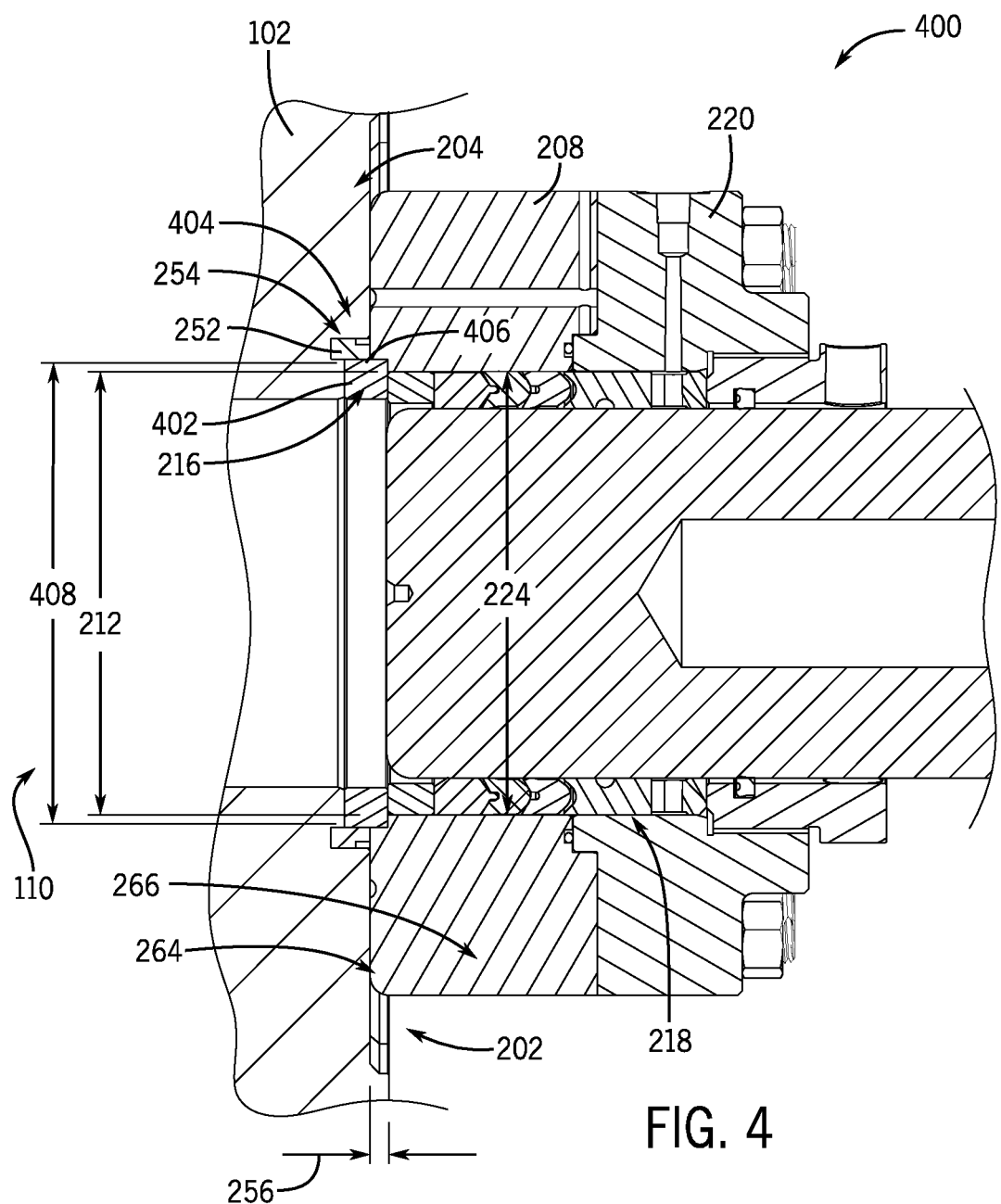
FIG. 4 is a cross-sectional view of an embodiment of a stuffing box assembly, in accordance with embodiments of the present disclosure.

FIG. 4 is a cross-sectional view of an embodiment of a stuffing box assembly 400 that may share one or more features with the stuffing box assembly 200 of FIG. 2. For simplicity and clarity, certain portions will not be repeated herein. In this example, the pressure ring 208 is arranged within the recessed area 204 and abuts the back side 202 of the fluid end 102. As described above, the internal portion 264 extends into the groove depth 256. In this example, the internal portion 264 is less than the external portion 266. In at least one embodiment, the pressure ring 208 compresses the face seal 252, which in this example is shown associated with the back side 202 within the face groove 254, but in other examples may be associated with the pressure ring 208. Furthermore, as described above, the adjacent ring 220 is coupled to the pressure ring 208.

In this example, a spacer ring 402 is positioned along a transition 404 at the bore 110. As shown, the spacer ring 402 is arranged proximate the face seal 252 and extends axially away from the back side 202 such that the spacer ring 402 at least partially overlaps the face groove 254. It should be appreciated that, in various embodiments, a conjoined groove or set of grooves may be utilized to receive the face seal 252 and the spacer ring 402. Moreover, in one or more embodiments, material may separate grooves for the face seal 242 and the spacer ring 402. In various embodiments, the space ring 402 may even form a portion of the bore 110. The spacer ring 402 may be utilized as the shelf 216, as described above, to receive the packing materials 218.

As shown, the pressure ring 208 may include a notch 406 that receives a portion of the spacer ring 402. For example, the notch 406 may represent a groove or an increased diameter portion 408, compared to the inner diameter 212, to receive and support at least a portion of the spacer ring 402. In various embodiments, the pressure ring 208, in combination with one or more other elements, at least partially blocks axial movement of the spacer ring 402 away from the back side 202 (toward the right relative to the orientation of FIG. 4). It should be appreciated that relative dimensions for the spacer ring 402 and/or notch 406 may be particularly selected based on operating conditions. In operation, the illustrated stuffing box assembly 400 enables isolation of the pressurized fluids within the fluid end 102 by supporting one or more components against the back side 202 of the fluid end 102.

As noted above, in this example the pressure ring 208 includes three different internal diameter positions, namely the inner diameter 212, the second inner diameter 224, and the increased diameter portion 408. In this example, the increased inner diameter portion 408 is smaller than the second inner diameter 224, but larger than the inner diameter 212. Accordingly, it should be appreciated that various different stepped portions may be positioned along the pressure ring bore 210 to facilitate positioning and retention of one or more components utilized with the stuffing box assembly 200.

Figure 5:
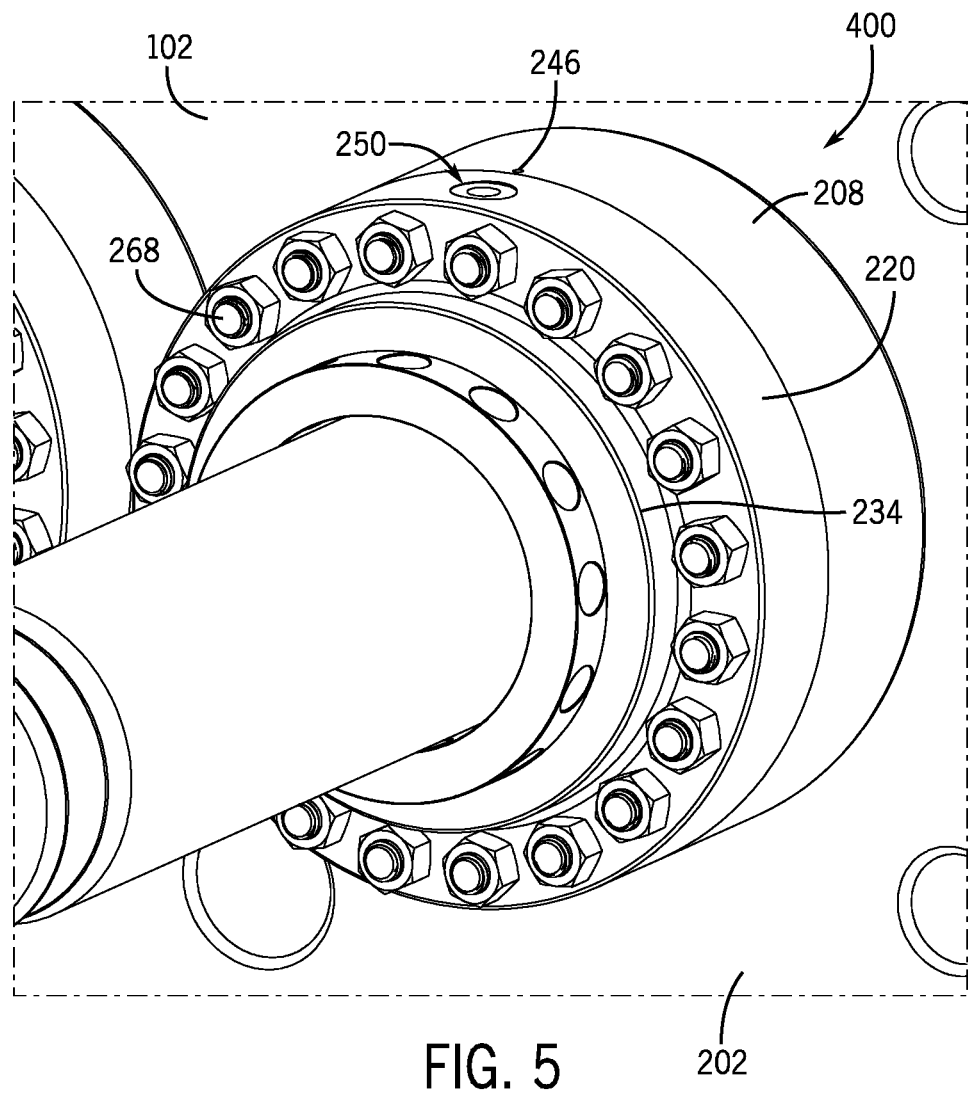
FIG. 5 is an isometric view of an embodiment of a stuffing box assembly, in accordance with embodiments of the present disclosure.

FIG. 5 is an isometric view of an embodiment of the stuffing box assembly 400. In this example, the pressure ring 208 and the adjacent ring 220 are both illustrated extending axially away from the back side 202. Further illustrated are the fasteners 268 extending through the pressure ring 208 and the adjacent ring 220 to couple the stuffing box assembly 400 to the back side 202. For example, the fasteners 268 may extend into mating apertures formed in the fluid end 102. Moreover, as noted above, the retainer 234 is arranged within the adjacent ring 220, for example coupled via threads. The injection port 250 is arranged positioned proximate the weep hole 246. As noted above, while a single port 250 and single weep hole 246 are illustrated in this example, more may be included, for example at different circumferential positions.

Figure 6:
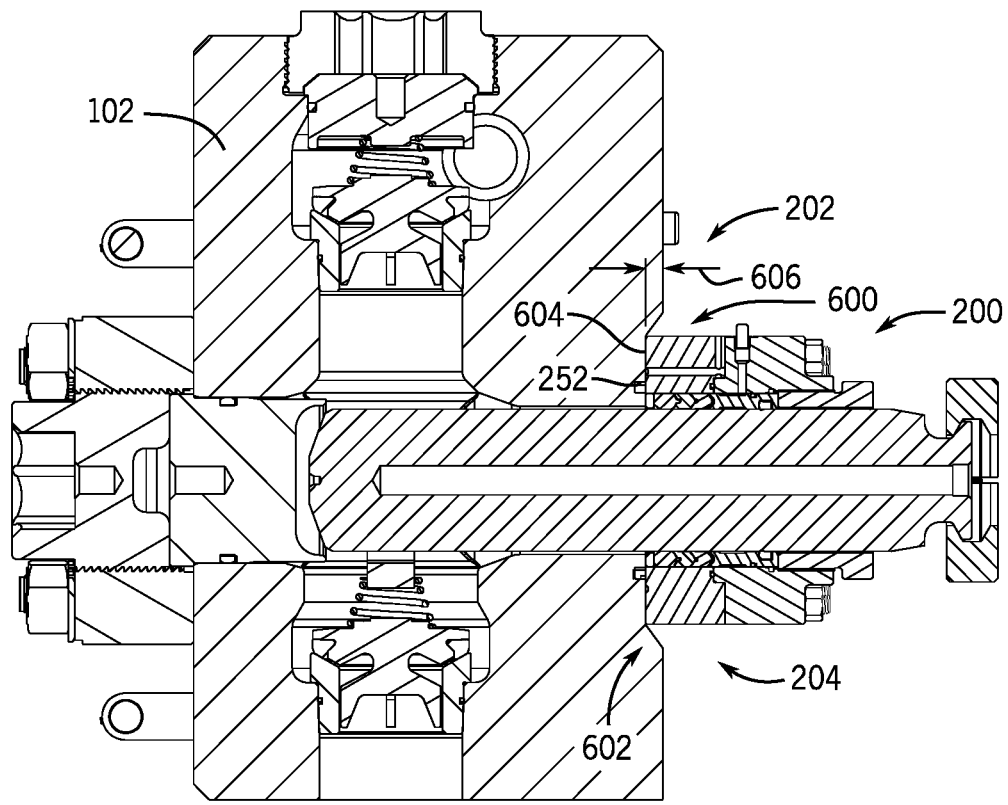
FIG. 6 is a cross-sectional view of an embodiment of a stuffing box assembly, in accordance with embodiments of the present disclosure.

FIG. 6 is a cross-sectional view of an embodiment of the stuffing box assembly 200 coupled to a back side 202 of the fluid end 102. In this example, the recessed area 204 is represented by a cut out region 600, which will be described in more detail below. In this example, the cut out region 600 includes a sloped entry 602 and a mating face 604, which represents at least a portion of the back side 202 of the fluid end 102. As shown, the cut out region 600 includes a depth 606 (similar to the groove depth 256), which may be representative of removed material or the part may be cast or otherwise formed without this material. As a result, inclusion of additional components abutting the back side 202 may not substantially increase an overall size of the fluid end 102. While the illustrated embodiment includes the recessed area 204 as the cut out region 600, it should be appreciated that various embodiments may include an extruded or outwardly extended region as opposed to a cut out region. By way of example, the portions illustrated as the cutout region 600 may extend outwardly and away such from back side 202 as opposed as being recessed. Moreover, as will be described below, additional geometries may also be utilized to form the cut out region 600 and/or any extruded or outwardly extending region.

It should be appreciated that the sloped entry 602 is for illustrative purposes only, along with the substantially symmetrical configuration of the cut out region 600. For example, the sloped entry 602 may be replaced by squared (e.g., approximately 90 degree) walls and/or a curved entry. Furthermore, in various embodiments, the cut out region 600 extends along a length of the fluid end, as illustrated in below. However, in other embodiments, individual cut out regions 600 may be formed from the fluid end. In operation, the stuffing box assembly 200 may couple to the back end 202, within the cut out region 600, to compress the face seal 252, as described above.

Figure 7:
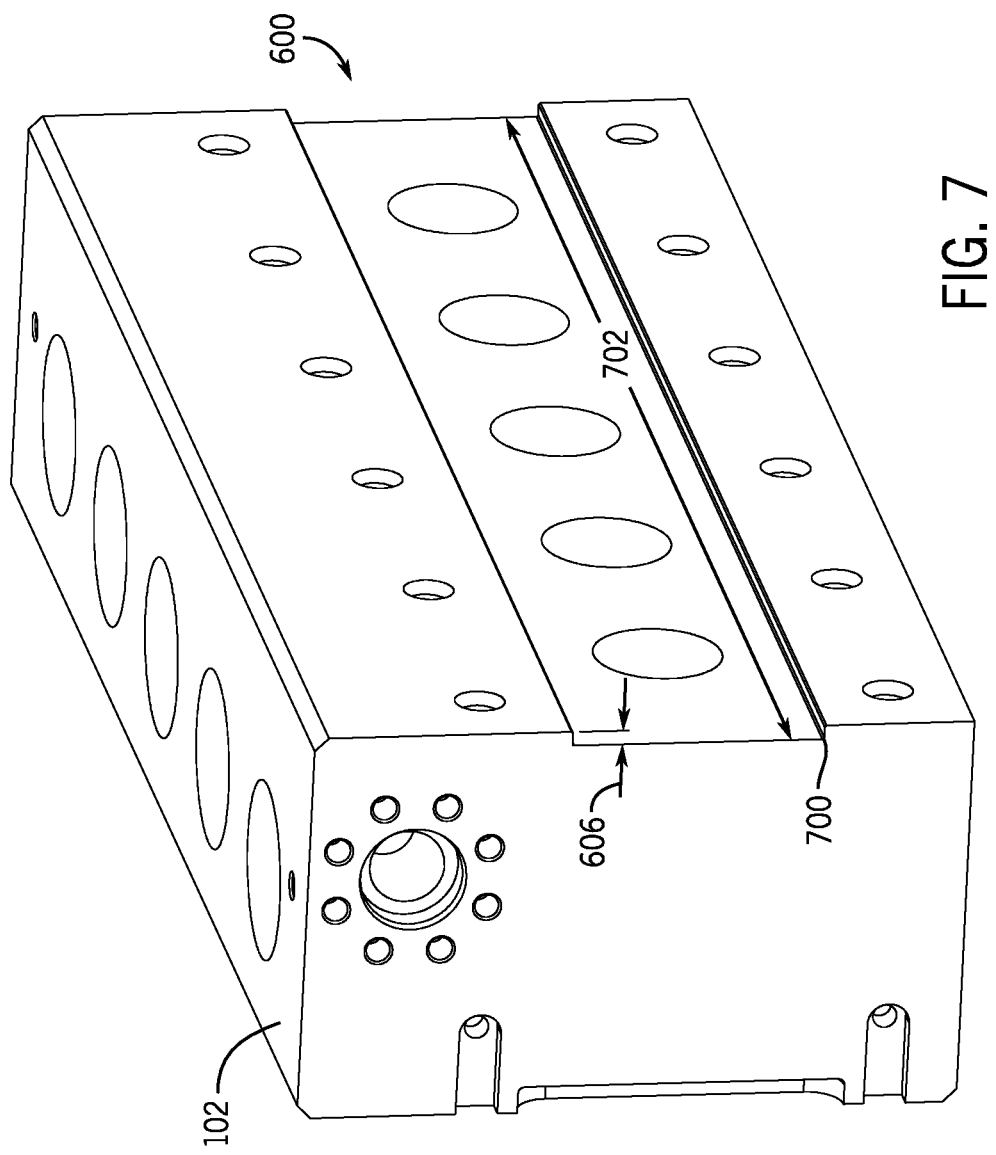
FIG. 7 is an isometric view of an embodiment of a fluid end, in accordance with embodiments of the present disclosure.

FIG. 7 is a schematic view of an embodiment of the fluid end 102 illustrating the cut out region 600. In this example, the cut out region 600 is substantially squared. That is, the sloped entry 602 (FIG. 6) is replaced by a squared entry 700, which may be substantially 90 degrees. Like the sloped entry 602, the squared entry 700 may be referred to as having a polygonal profile. The squared entry 700 transitions to the depth 606, as noted above. Moreover, the cut out region 600 extends for a fluid end length 702, but it should be appreciated that the cut out region 600 may be segmented or not extend the full length 702. The illustrated depth 606 is also particularly selected based on operating conditions.

In one or more embodiments, the fluid end 102 is forged or otherwise manufactured in the configuration shown, which may result in less material being utilized in operations. In one or more embodiments, the fluid end 102 may also be machined to include the cut out region 600. Accordingly, the general shape of the cut out region 600 may also be selected, at least in part, with manufacturing considerations in mind.

Figure 8:
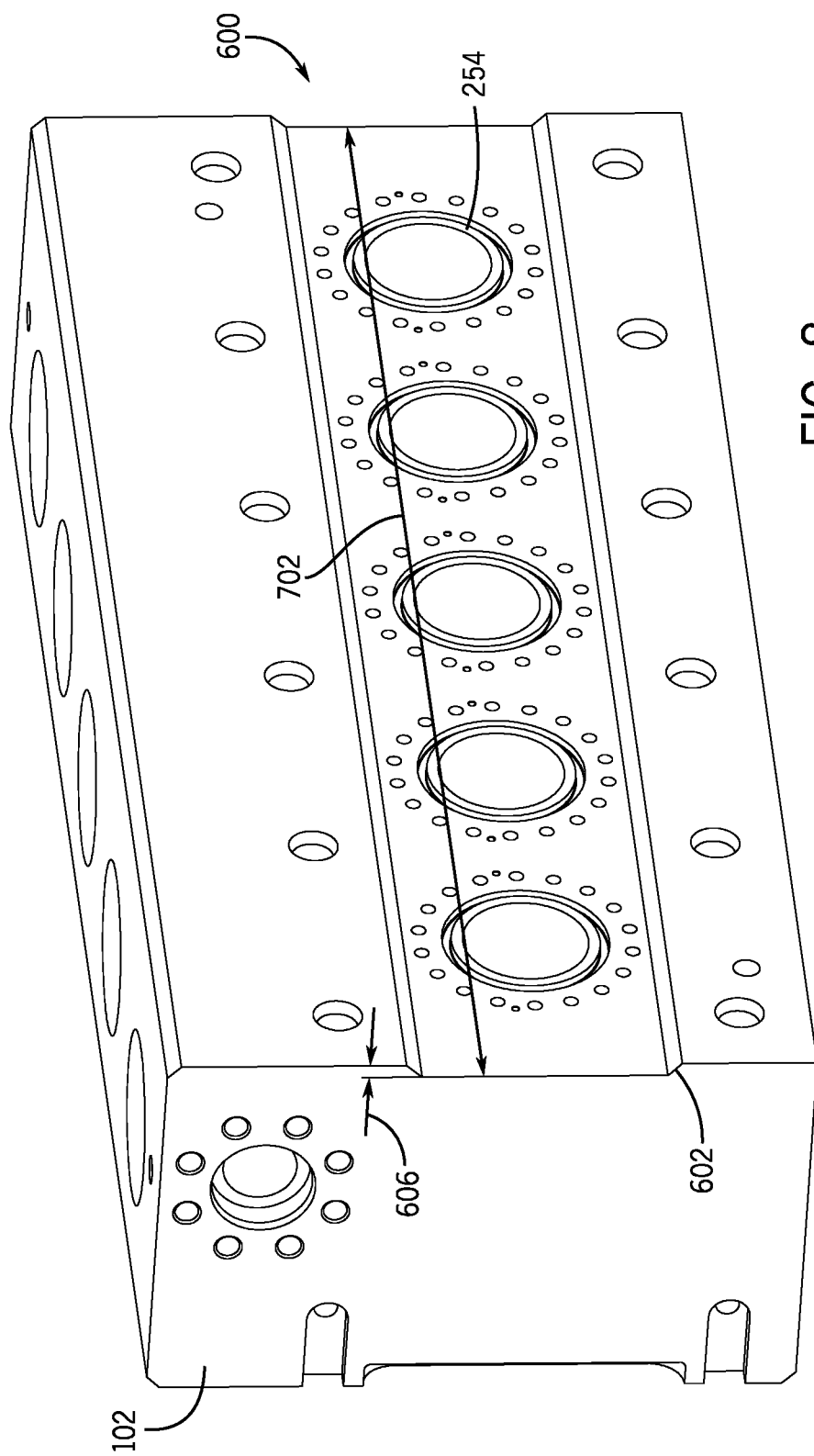
FIG. 8 is an isometric view of an embodiment of a fluid end, in accordance with embodiments of the present disclosure.

FIG. 8 is a schematic view of an embodiment of the fluid end 102 illustrating the cut out region 600. In this example, the sloped entry 602 is visible, as shown in FIG. 6. Moreover, the cut out region 600 extends for a fluid end length 702, but it should be appreciated that the cut out region 600 may be segmented or not extend the full length 702. The illustrated depth 606 is also particularly selected based on operating conditions. This example further includes the face groove 254 for the face seal 252 (FIG. 2) and the apertures for receiving the fasteners 268 (FIG. 2).

Figure 9:
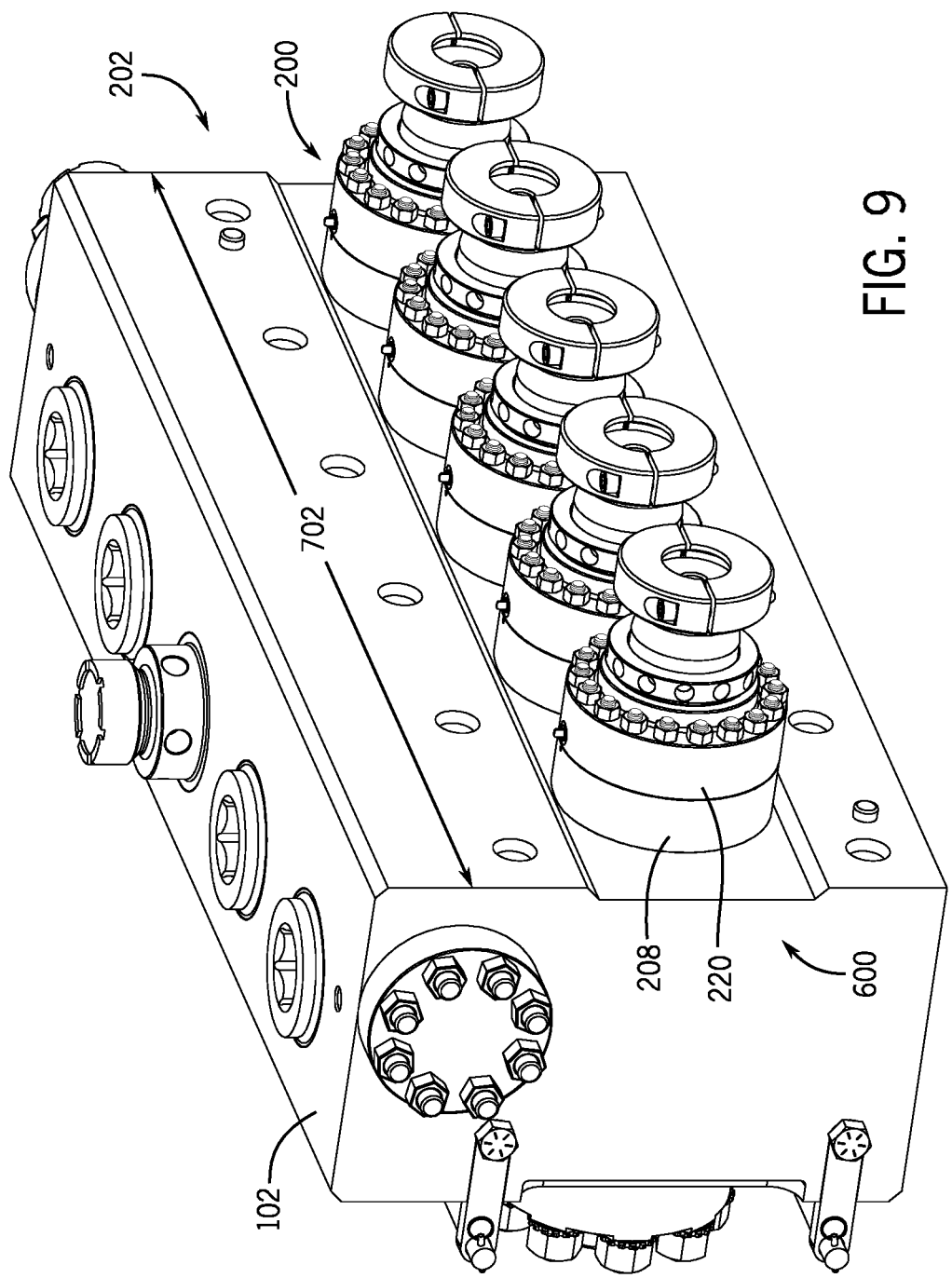
FIG. 9 is an isometric view of an embodiment of a fluid end with a stuffing box assembly, in accordance with embodiments of the present disclosure.

FIG. 9 is an isometric view of an embodiment of the fluid end 102 including the stuffing box assemblies 200 coupled to the back side 202 within the cut out region 600. In this example, the cut out region 600 extends for the fluid end length 702. As noted above, in various embodiments of the present disclosure, stuffing box assemblies 200 are arranged such that one or more components bear against the back side 202 of the fluid end 102 and without extending into the bore 100.

It should be appreciated that various embodiments of the present disclosure may incorporate materials formed from similar or dissimilar materials. By way of example, the pressure ring 208 may be formed from a stronger, more resistant material than the adjacent ring 220 due to the pressure ring 208 being in contact with pressurized fluid while the adjacent ring 220 may be isolated from the fluid. Accordingly, less expensive materials may be utilized for the adjacent ring 220. It should be appreciated that all materials used may be particularly selected for expected operating conditions.

Figure 10:
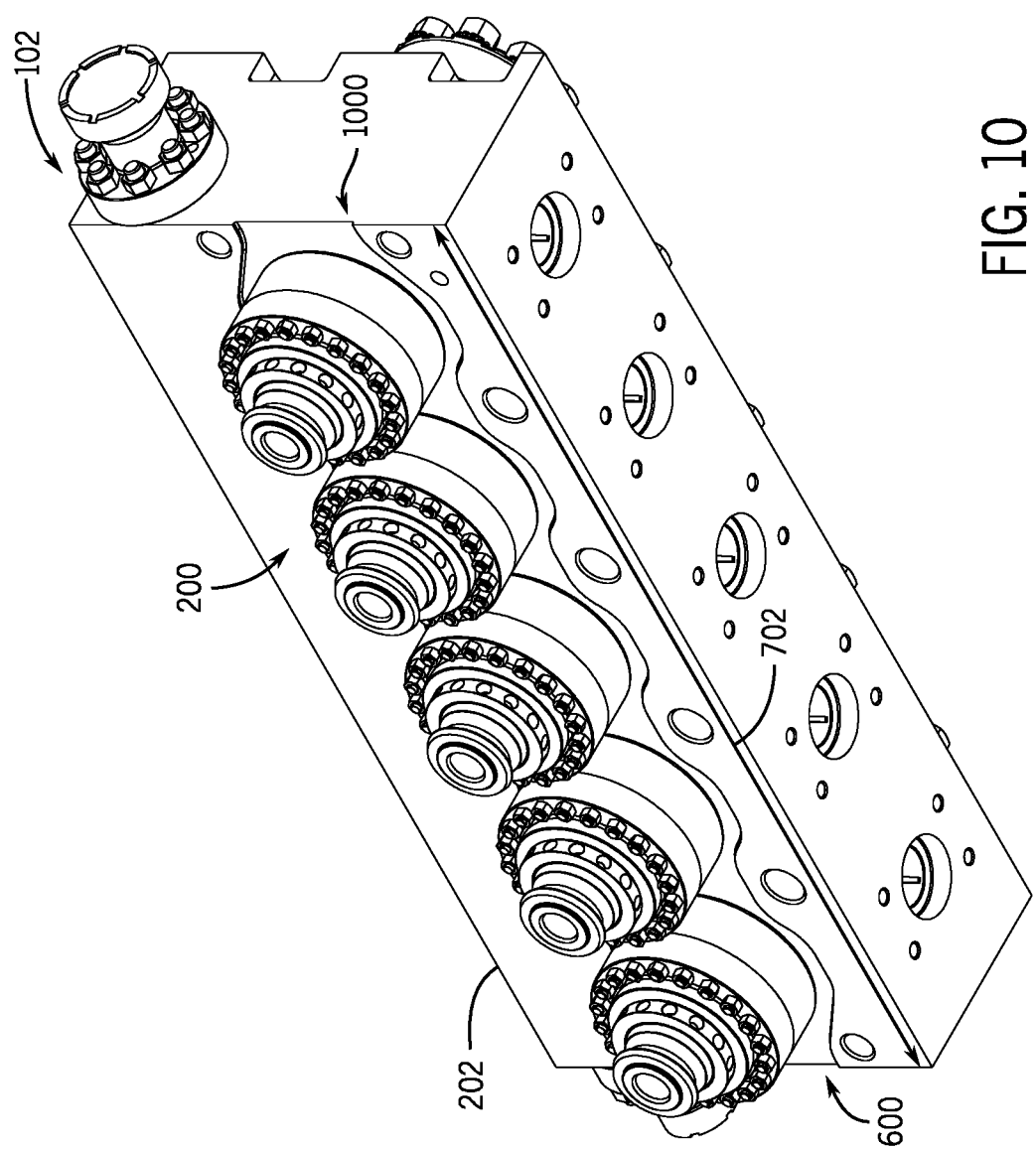
FIG. 10 is an isometric view of an embodiment of a fluid end with a stuffing box assembly, in accordance with embodiments of the present disclosure.

FIG. 10 is a bottom perspective view of an embodiment of the fluid end 102 including the cutout region 600 having a sinusoidal pattern 1000, which may also be referred to as having a curved or arcuate profile. As noted above, while various embodiments may include the squared entry and/or the sloped entry, a variety of different patterns may be included for forming the cutout region 600. In this example, the sinusoidal pattern 1000 extends along the length 702 of the fluid end 102. As noted above, in various embodiments of the present disclosure, stuffing box assemblies 200 are arranged such that one or more components bear against the back side 202 of the fluid end 102 and without extending into the bore 100.

Figure 11:
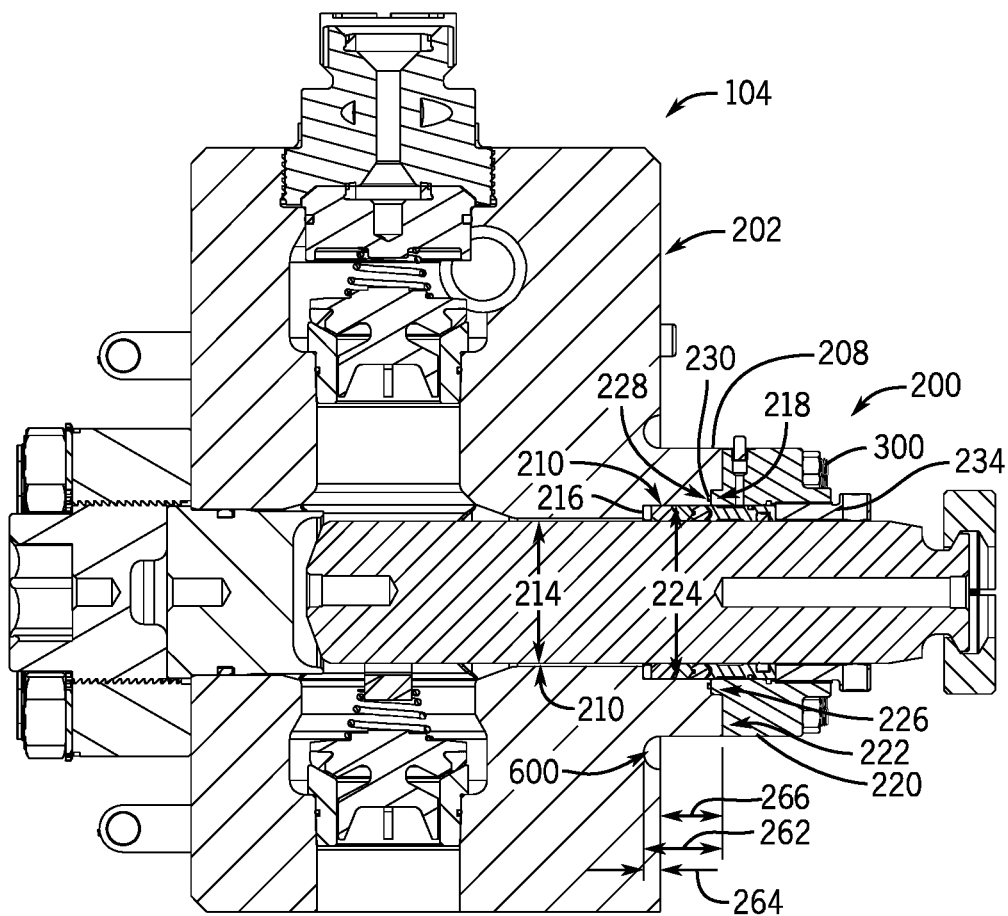
FIG. 11 is a cross-sectional view of an embodiment of a stuffing box assembly, in accordance with embodiments of the present disclosure.
Figure 12:
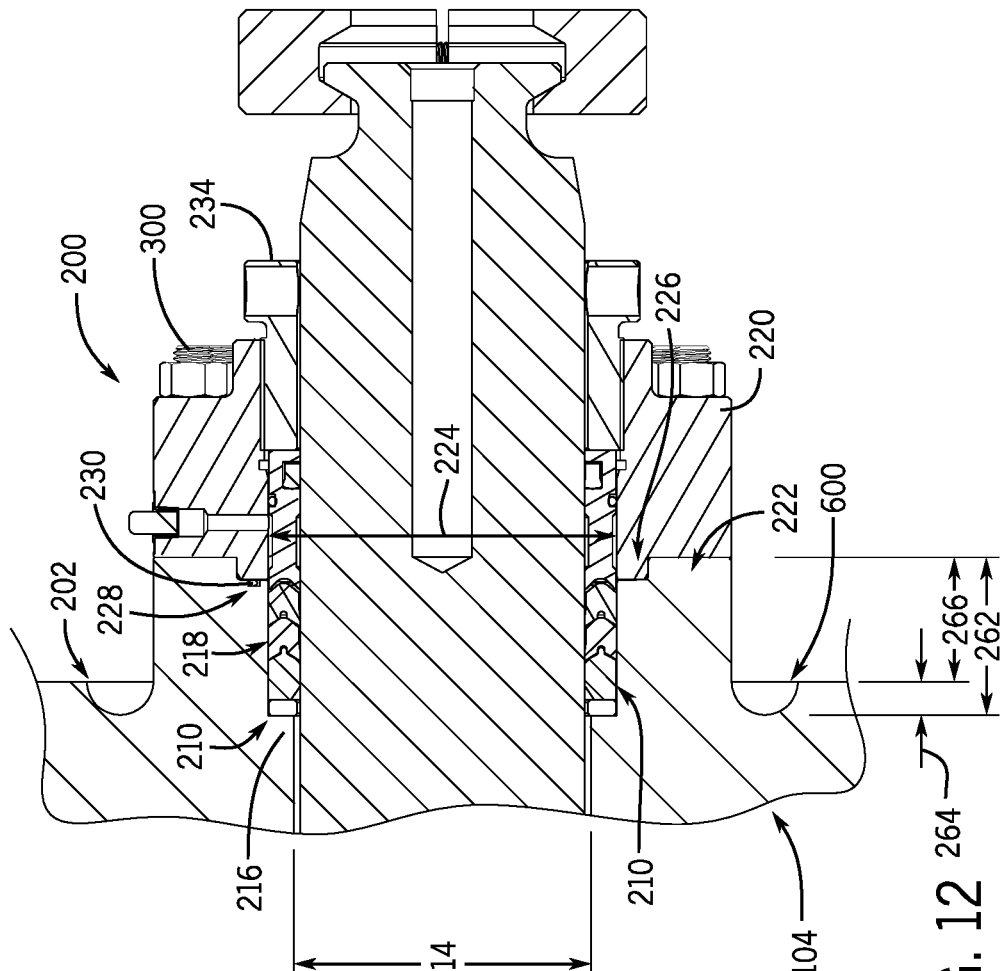
FIG. 12 is a cross-sectional view of an embodiment of a stuffing box assembly, in accordance with embodiments of the present disclosure.

FIGS. 11 and 12 are cross-sectional views of an embodiment of the fluid end 102 including the stuffing box assembly 200 in which the pressure ring 208 is integrally formed with and/or is a continuous portion of the fluid end block 104. In this example, the pressure ring 208 extends axially out of the cut out region 600 and may replace or otherwise incorporate the mating face 604 (FIG. 6) described above with a continuous material layout such that the pressure ring 208 is formed from a common material with respect to the fluid end block 104.

As noted above, the pressure ring 208 includes the pressure ring bore 210, which has a larger diameter (e.g., diameter 224) than the bore diameter 214. In this manner, the shelf 216 may be formed along the fluid end block 104 to receive and support the packing materials 218, as noted above. Accordingly, the packing materials 218 may be described as not extending into the bore 110 of the fluid end block 104 and being axially blocked or restricted from moving into the bore 110 by the shelf 216. Further illustrated in FIGS. 11 and 12 are the seal groove 228 and seal 230 between the pressure ring 208 and the adjacent ring 220.

As will be appreciated, various features of FIG. 2 are shared in FIGS. 11 and 12, including the configuration of the adjacent ring 220 with respect to the pressure ring 208. For example, in this example, a lip 226 of the adjacent ring 220 may extend axially toward the bore 110 such that a portion of the pressure ring 208 radially overlaps at least a portion of the adjacent ring 220. This may be referred to as the overlapped region 222, as noted above, where the pressure ring 208 includes the diameter 224 to accommodate the lip 226. Further shown is the retainer 234 extending into the adjacent ring 220 to secure the packing materials 218 in place.

Various embodiments of the present disclosure illustrate a secure coupling between the adjacent ring 220 and the pressure ring 208 and/or the fluid end block 104 via one or more fasteners 300, which may extend through apertures or holes through the adjacent ring 220 and/or pressure ring 208 and/or fluid end block 104 that are aligned to permit passage of the fasteners 300. As noted above, fasteners 300 are provided by way of example only and various other components may be utilized to join different features together, such as press fittings, interference fits, adhesives, bayonet connections, tongue and groove fittings, and the like.

Embodiments of the present disclosure further illustrate an arrangement that permits easier access to different components of the stuffing box assembly 200 due to the improved clearance between components. For example, as noted above, the pressure ring 208 may extend axially away from the back side 202 such that at least a portion of the pressure ring thickness 262 is external the groove 204. That is, the pressure ring thickness 262 may include the internal portion 264 that is within the groove 204 and the external portion 266 that is outside of the groove 204. In various embodiments, the internal portion 264 is less than the external portion 266, but it should be appreciated that a variety of configurations may be utilized within the scope of the present disclosure (e.g., internal greater than external, portions equal, etc.). When combined with the groove 204, which may have a depth 606 (FIG. 6), additional clearance area may be provided to various components, such as the fasteners 300, thereby providing improved access for maintenance or other operations, such as packing replacement and the like.

Figure 13:
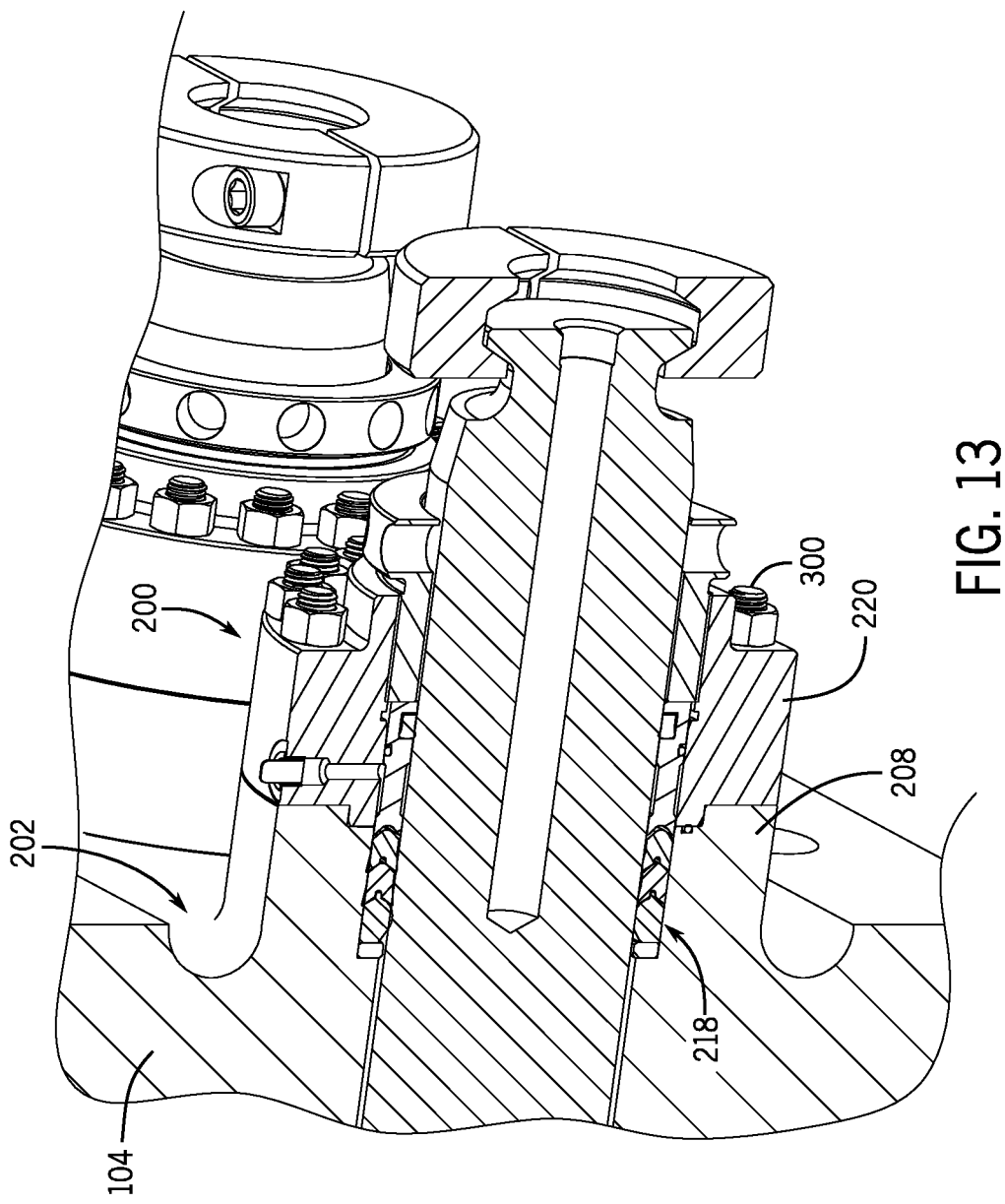
FIG. 13 is a sectional isometric view of an embodiment of a stuffing box assembly, in accordance with embodiments of the present disclosure.

FIG. 13 is a sectional perspective view of an embodiment of the stuffing box assembly 200 illustrating the pressure ring 208 formed as an integral feature of the fluid end block 104. In this example, the pressure ring 208 extends away from the back side 202, which may permit increased working area for operators, as shown with respect to the illustrated fasteners 300. Further illustrated is the arrangement of the adjacent ring 220 axially outward with respect to the back side 202. As noted, this configuration may permit the adjacent ring 220 to be formed from materials that are less expensive and/or less likely to be in contact with corrosive or otherwise high pressure fluids, for example, due to the arrangement of the packing materials 218. It should, however, be appreciated that various embodiments may adjust one or more dimensions such that the adjacent ring 220 extends axially closer to the back end 202 such that the packing materials 218 overlap or otherwise are positioned adjacent to the adjacent ring 220.

Figure 14:
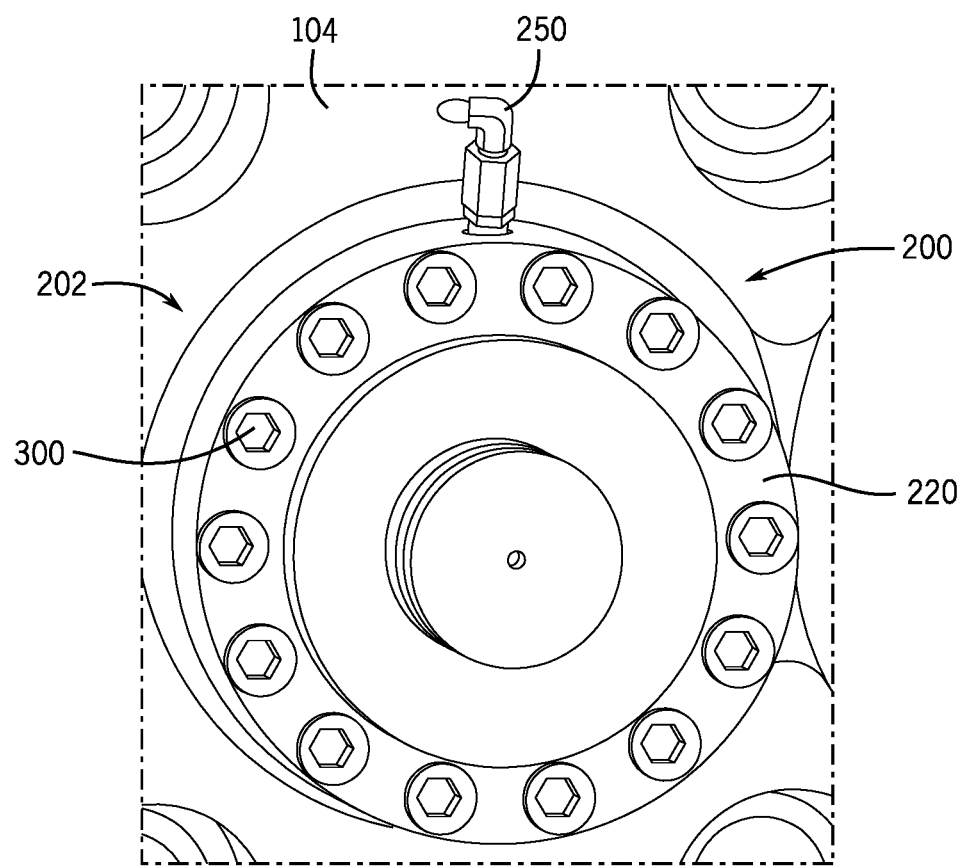
FIG. 14 is a perspective view of an embodiment of a stuff boxing assembly, in accordance with embodiments of the present disclosure.

FIG. 14 is a perspective view of an embodiment of the stuffing box assembly 200 that illustrates the adjacent ring 220 extending axially away from the back side 202. Further illustrated in this configuration is the injection port 250. As shown, the fasteners 300 are arranged circumferentially to extend through the adjacent ring 220, which may further go through aligned holes in the pressure ring 208 (FIGS. 11-13), which may or may not extend all the way to the fluid end block 104 (e.g., through the entire pressure ring thickness 262 (FIGS. 11 and 12).

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system comprising:
   a fluid end having a fluid end face and a recess extending toward a base;
   a pressure ring extending from the base, the pressure ring having a pressure ring bore diameter larger than a fluid end bore diameter;
   an adjacent ring coupled to the fluid end, the pressure ring positioned between the adjacent ring and the base;
   at least one fastener extending through an aperture of the adjacent ring to couple the adjacent ring to the fluid end, the at least one fastener extending entirely through the pressure ring and into the base; and
   packing material positioned within at least a portion of the pressure ring bore, the packing material positioned such that axial movement toward the fluid end is blocked by the base.

2. The system of claim 1, further comprising:
   a shelf positioned to support the packing material, the shelf located at a transition between the pressure ring bore diameter and the fluid end bore diameter.

3. A system comprising:
   a fluid end having a fluid end face and a recess extending toward a base;
   a pressure ring extending from the base, the pressure ring having a pressure ring bore diameter larger than a fluid end bore diameter;
   an adjacent ring coupled to the fluid end, the pressure ring positioned between the adjacent ring and the base;
   at least one fastener extending through an aperture of the adjacent ring to couple the adjacent ring to the fluid end;

packing material positioned within at least a portion of the pressure ring bore, the packing material positioned such that axial movement toward the fluid end is blocked by the base; and a shelf positioned to support the packing material, the shelf located at a transition between the pressure ring bore diameter and the fluid end bore diameter, and the shelf being formed, at least in part, by a spacer ring.

4. The system of claim 1, wherein the pressure ring is integrally formed with the fluid end.

5. The system of claim 1, further comprising:

a cut out region defining a recessed area around the pressure ring, the cut out region extending axially into the fluid end face, toward the base, for a cut out depth.

6. The system of claim 5, wherein a pressure ring thickness includes an internal portion and an external portion, the internal portion having a thickness approximately equal to the cut out depth.

7. The system of claim 5, wherein the cut out region extends for a length of the fluid end.

8. The system of claim 1, further comprising:

an overlapping region between the pressure ring and the adjacent ring, and wherein the pressure ring includes a recess arranged to receive a lip of the adjacent ring.

9. The system of claim 1, further comprising:

a seal positioned between the pressure ring and the adjacent ring.

10. A system comprising:

a fluid end having a recessed area;

a pressure ring extending from the recessed area, the pressure ring having a pressure ring bore positioned co-axially with a fluid end bore, and the pressure ring bore having a diameter greater than the fluid end bore;

an adjacent ring positioned against the pressure ring and coupled to the fluid end;

one or more fasteners extending entirely through a pressure ring thickness;

packing material positioned within the pressure ring bore, at least a portion of the packing material positioned external to the fluid end bore; and an injection port extending through the adjacent ring, the injection port arranged in a low pressure region, axially away from a seal between the pressure ring and the adjacent ring.

11. The system of claim 10, wherein the pressure ring and the adjacent ring are coupled together via the one or more fasteners.

12. The system of claim 10, wherein the pressure ring is integrally formed with the fluid end.

13. The system of claim 10, wherein the pressure ring and the adjacent ring are at least one of threaded together or coupled together via a bayonet connection.

14. The system of claim 10, further comprising:

a shelf located at a transition between the pressure ring bore and the fluid end bore, and wherein the shelf receives and supports the packing material.

15. The system of claim 10, wherein the recessed area is formed by at least one of a polygonal profile or a curved profile.

16. A method comprising:

providing a fluid end including a recessed area extending into a fluid end face and a pressure ring extending axially out of the recessed area;

positioning an adjacent ring against the pressure ring;

securing the adjacent ring to the fluid end via one or more fasteners extending entirely through a pressure ring thickness; and installing, within a pressure ring bore, packing material.

17. The method of claim 16, further comprising:

coupling, to the adjacent ring, a retainer to compress the packing material against a shelf formed at a transition between a fluid end bore and the pressure ring bore.

18. The method of claim 16, wherein the pressure ring is integrally formed with the fluid end.

* * * * *